United States Patent [19]

Ninomiya et al.

[11] Patent Number: 4,656,089
[45] Date of Patent: Apr. 7, 1987

[54] MAGNETIC RECORDING MEDIUM

[75] Inventors: Yoshinobu Ninomiya; Masakazu Muroyama; Masayoshi Sugiyama; Akira Hashimoto, all of Miyagi, Japan

[73] Assignee: Sony Corporation, Tokyo, Japan

[21] Appl. No.: 785,555

[22] Filed: Oct. 8, 1985

[30] Foreign Application Priority Data

Oct. 9, 1984 [JP] Japan .................. 59-211650

[51] Int. Cl.$^4$ .................................. G11B 5/70
[52] U.S. Cl. .................. 428/327; 252/62.54; 427/128; 428/328; 428/329; 428/694; 428/900; 428/425.9
[58] Field of Search ............. 427/131, 128; 428/694, 428/695, 900, 328, 327, 329, 425.9; 252/62.54; 360/134–136

[56] References Cited

U.S. PATENT DOCUMENTS

| | | | |
|---|---|---|---|
| 2,904,875 | 9/1959 | Trigg | 427/128 |
| 4,076,890 | 2/1978 | Yamada | 428/327 |
| 4,256,852 | 3/1981 | Naruse | 427/128 |
| 4,521,486 | 6/1985 | Ninomiya | 428/407 |
| 4,529,661 | 7/1985 | Ninomiya | 428/425.9 |
| 4,544,601 | 10/1985 | Yamaguchi | 428/900 |
| 4,571,364 | 2/1986 | Kasuga | 428/694 |
| 4,579,778 | 4/1986 | Yamaguchi | 428/900 |

Primary Examiner—Ellis P. Robinson
Attorney, Agent, or Firm—Hill, Van Santen, Steadman & Simpson

[57] ABSTRACT

A magnetic recording medium comprising a non-magnetic base and a magnetic layer attached thereto consisting essentially of magnetic powders and a binder. Included within the binder are spherical small sized particles of a benzoguanamine-formaldehyde resin or a benzoguanamine-melamine-formaldehyde resin which serve to improve the running characteristics, reduce the friction coefficient, and improve the strength of the layer.

6 Claims, No Drawings

MAGNETIC RECORDING MEDIUM

BACKGROUND OF THE INVENTION

1. Field of the Invention

This invention is in the field of magnetic recording media such as magnetic tapes or disks and provides an improved binder composition.

2. Description of the Prior Art

In the field of modern magnetic recording, the tendency is towards increasing the recording density and using shorter wavelength recording signals. For use therewith, a coated type magnetic recording medium has been provided in which the magnetic layer is produced by applying a coating of a magnetic paint on a non-magnetic base with small sized magnetic particles dispersed in the magnetic layer. The small size is desired to achieve a higher packing density and a resulting improved smoothness or lubricity of the magnetic layer.

With improved smoothness or lubricity of the magnetic layer, the spacing loss is advantageously lowered. However, certain inconveniences arise in the tape running and durability characteristics. When the magnetic layer is too smooth, the recording medium tends to be affixed to, for example, the magnetic head, guide posts, or to the cylinder for a rotating head. In addition, the effective contact area is increased, thereby increasing the frictional coefficient so that tape running is affected adversely or inhibited. The increase in frictional coefficient results in increased tape tension causing powder to flake off, a deteriorated profile, or head clogging as well as an adverse effect on the tape durability.

With a magnetic recording medium used for high density recording, it is necessary to procure to some extent a proper volumetric density of the magnetic powders of the magnetic layer from the viewpoint of electromagnetic conversion characteristics. In this case, an increase in the specific surface area caused by comminution of the magnetic powders deteriorates the coating properties of the magnetic layer in an undesirable way. Thus, comminution of the magnetic powders deteriorates the running of the magnetic tape or the physical properties of the magnetic layer.

SUMMARY OF THE INVENTION

The present invention seeks to overcome the aforementioned difficulties involving the deterioration of the coating properties or increase in the specific surface area caused by comminution of the magnetic powders and to produce a magnetic recording medium which is smooth running and also has excellent durability, as well as providing a magnetic coating layer of improved strength.

In order to achieve the above objective, the present inventors have conducted prolonged research and found that the addition of spherical, small sized particles of a benzoguanamine-formaldehyde resin or a benzoguanamine-melamine-formaldehyde resin are highly effective in providing surface smoothness or lubricity and improving the coating properties. The present invention thus resides in a magnetic recording medium comprising a non-magnetic base and a magnetic layer containing magnetic powders and a binder, the binder including spherical small sized particles of a benzoguanamine-formaldehyde resin or a benzoguanamine-melamine-formaldehyde resin uniformly dispersed therethrough. It has been found that tape running is improved with an increased smoothness of the magnetic layer, and the tape durability is also improved by virtue of the increased strength of the magnetic layer.

It is preferred to use magnetic powders having specific surface areas of at least 30 $m^2/g$ and to use as a binder, a resin material which contains certain hydrophilic polar groups as will be apparent from the succeeding description.

DESCRIPTION OF THE PREFERRED EMBODIMENTS

In the magnetic recording medium of the present invention, a magnetic layer is provided by coating on the surface of a non-magnetic base such as polyethylene terephthalate a magnetic paint consisting of kneaded and dispersed spherical small sized particles of a benzoguanamine-formaldehyde resin or a benzoguanamine-melamine-formaldehyde resin for the purpose of improving the surface and coating properties of the magnetic layer.

The spherical particles of small size of the benzoguanamine-formaldehyde resin or the benzoguanamine-melamine-formaldehyde resin are high polymeric pigments and are endowed with improved strength as well as heat, solvent and chemical resistance. When added to the magnetic paint, the spherical, small sized particles are not dissolved in the organic solvent contained in the magnetic paint, while the particles are not deformed or decomposed under the elevated temperatures or the high shearing forces which occurred during kneading.

The benzoguanamine-formaldehyde or benzoguanamine-melamine-formaldehyde resin are extremely hard materials so that they have a superior hardness and act as solid lubricants within the magnetic layer. The surface roughness of the magnetic layer can be controlled by selection of the particle size of these powders. Thus, the lubricity may be provided for the tape surface by moderately roughening the surface of the magnetic layer.

The benzoguanamine-formaldehyde resin particles can be obtained by a condensation of benzoguanamine and formaldehyde, usually on an equimolar basis. The benzoguanamine-melamine-formaldehyde resin particles can also be obtained by a co-condensation reaction of benzoguanamine-melamine, and formaldehyde. The condensation reaction is carried out in a suitable solvent with an emulsifier such as polyvinylformal. The particle diameter can be controlled by controlling the concentration of reaction solution and/or reaction speed. Details for the preparation of such spherical particles of benzoguanamine-formaldehyde and benzoguanamine-melamine-formaldehyde are described in published Japanese Patent Application No. 42614/81.

It is particularly interesting that the spherical small sized particles of the benzoguanamine-formaldehyde or benzoguanamine-melamine-formaldehyde resin have an affinity for the binder used in the magnetic paint composition and thus are useful in improving the coating properties of the magnetic layer. Such affinity of the magnetic paint with a binder is a very desirable property when the non-magnetic particles are to be added to the magnetic paint. For example, when a material with low affinity for the binder such as an inorganic pigment is used, the properties of the resulting magnetic recording medium such as the signal-to-noise ratio (S/N) are significantly lowered. On the contrary, the benzoguanamine-formaldehyde or benzoguanamine-melamine-formaldehyde resins are condensation products compatible with the resins of the binder so that a reasonable affinity may be expected of these resin materials, and the S/N ratio is not likely to be lowered by the addition of these materials. In fact, microscopic observation of the sectional surface with the aid of a microtome has revealed that the spherical fine particles are uniformly dispersed in the magnetic layer. From this it may be inferred that the spherical fine particles contribute to improvement in the coating properties while affording lubricity to the tape and improving the running properties and durability of the magnetic recording medium.

In accordance with the present invention, the particle size of the spherical fine particles of the benzoguanamine-formaldehyde or benzoguanamine-melamine-formaldehyde is preferably in the range from 0.1 to 3 microns. With a particle size less than 0.1 micron, the effect of lubricity is markedly lower. With a particle size above 3 microns, the magnetic surface becomes more irregular so that the image quality is lowered.

The resin particles should be added in an amount of 1 to 10 parts by weight to 100 parts by weight of the magnetic particles. With an amount of resin particles less than the lower limit, no specific effect is observed. With an amount higher than the upper limit, the packing density of the magnetic particles is lowered in a manner not desired for high density recording.

Any commonly employed magnetic powders such as ferromagnetic iron oxide, ferromagnetic chromium dioxide or ferromagnetic alloy powders can be used as the magnetic powders constituting one of the components of the aforementioned magnetic layer.

The ferromagnetic iron oxide particles may be represented by the general formular $FeO_x$ where x is in the range from 1.33 to 1.50, that is, from gamma ferric oxide where x equals 1.50 to magnetite where x equals 1.33, or solid solutions in between where x is from 1.33 to 1.50. The particles of the Co-doped or Co-coated iron oxide material consisting of ferromagnetic iron oxide supplemented with cobalt for increasing the coercive force may also be used within the scope of the present invention.

As the ferromagnetic chromium dioxide, $CrO_2$, may be used by itself or with the addition of at least one of the elements Ru, Sn, Te, Sb, Fe, Ti, V and Mn for the purpose of increasing the coercive force.

As ferromagnetic alloy powders, Fe, Co, Ni, Fe-Co, Fe-Ni, Fe-Co-Ni or alloys thereof may be used. These metals or alloys can be supplemented with metallic elements such as Al, Si, Ti, Cr, Mn, Cu, or Zn for improving various properties of the magnetic tape.

The specific improvement provided by the spherical fine particles of the benzoguanamine-formaldehyde or the benzoguanamine-melamine-formaldehyde resins may be realized to the fullest extent with the use of magnetic particles of small particle size, that is, of large specific surface area. The utmost effect is achieved when the specific surface area of the magnetic particles is at least 30 m²/g, as measured with the BET method.

Any conventional binders can be used with the magnetic recording medium in making up the magnetic layer or film. These binders include vinyl chloride-vinyl acetate copolymers, vinyl chloride-vinyl acetate-vinyl alcohol copolymers, vinyl chloride-vinyl acetate-maleic acid copolymers, vinyl chloride-vinylidene chloride copolymers, vinyl chloride-acrylonitrile copolymers, acrylic acid ester-acrylonitrile copolymers, acrylic acid ester-vinylidene chloride copolymers, methacrylic acid ester-styrene copolymers, thermoplastic polyurethane resins, phenoxy resins, polyvinyl fluoride, vinylidene chloride-acrylonitrile copolymers, butadiene-acrylonitrile copolymers, acrylonitrile-butadiene-methacrylic acid copolymers, polyvinyl butyral, cellulose derivatives, styrene-butadiene copolymers, polyester resins, phenolic resins, epoxy resins, thermosetting polyurethane resins, urea resins, melamine resins, alkyd resins, urea-formaldehyde resins, or mixtures thereof.

It is particularly advisable to use a resin material having hydrophilic polar groups such as:

—SO₃M
—OSO₃M
—COOM and

where M is a hydrogen atom or an alkali metal, and M' is a hydrogen atom, an alkali metal or a hydrocarbon group.

Particularly effective results have been achieved when using such hydrophilic polar groups in polyurethane resins, polyester resins, or vinyl chloride-vinyl acetate copolymers. Resins of this type are described in U.S. Pat. No. 4,529,661 and Ninomiya et al pending applications Ser. Nos. 663,377 and 678,814, all of which are owned by the assignee of the present application.

The hydrophilic polar groups may be introduced into the resin materials by using one of several methods.

First, the following methods may be used for introducing such hydrophilic polar groups into polyurethane or polyester resins.

(1) The first method consists in previously introducing the aforementioned hydrophilic polar groups into the dibasic acid or polyol which is one of the starting materials for the preparation of the polyurethane or polyester resins.

(2) The second method consists in modifying the polyurethane or polyester resins having two or more functional OH groups.

As a practical example of the second method, compounds having both chlorine and hydrophilic polar groups such as $ClCH_2CH_2SO_3M$, $ClCH_2CH_2OSO_3M$, $ClCH_2COOM$ or

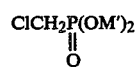

wherein M represents a hydrogen atom or an alkali metal and M' a hydrogen atom, an alkali metal or a hydrocarbon group, together with a polyurethane or polyester resin containing polyfunctional OH group or groups, are dissolved in a solvent in which both are soluble such as dimethylformamide or dimethylsulfoxide. The reactants are subjected to a dechlorination reaction between the OH group and Cl in the presence of a dechlorinating agent including amines such as pyridine, picoline, or triethylamine, or epoxy compounds such as ethylene oxide or propylene oxide.

(3) Equimolar amounts of compounds such as $HOCH_2CH_2SO_3M$, $HOCH_2CH_2OSO_3M$, $HOCH_2COOM$ or

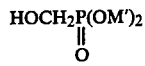

and a diisocyanate compound such as 4,4-diphenylmethane diisocyanate, tolylene diisocyanate, or hexamethylene diisocyanate are reacted to give a reaction product between one NCO group of the diisocyanate and the OH group in the molecule.

The OH group of the polyurethane or polyester resin and the other NCO group are then reacted to form a polyurethane or polyester resin into which the hydrophilic polar groups are already introduced. A small amount of by-products are formed during this process.

The starting materials for the vinyl chloride copolymer into which the hydrophilic polar groups are introduced may include vinyl chloride-vinyl acetate-vinyl alcohol copolymer, vinyl chloride-vinyl propionate-vinyl alcohol copolymer and vinyl chloride-vinyl acetate-vinyl propionate-vinyl alcohol copolymer. Preferably, the vinyl alcohol component consists of 0.5 to 20 weight percent of the total copolymer. In synthesizing the copolymer, the OH group of vinyl alcohol is reacted with $ClCH_2CH_2OSO_3M$, $ClCH_2CH_2SO_3M$, $ClCH_2COOM$ or

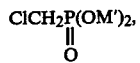

where M represents hydrogen or an alkali metal, and M' a hydrogen atom, an alkali metal or a hydrocarbon residue in the presence of a solvent such as dimethylformamide (DMF) or dimethylsulfoxide (DMSO) with the aid of a dechlorinating agent including amines such as pyridine, picoline or triethylamine, or epoxy compounds such as ethylene oxide or propylene oxide. Some by-products are also formed by these methods.

As an alternative method, equimolar amounts of one of the compounds $HOCH_2CH_2OSO_3M$, $HOCH_2CH_2SO_3M$, $HOCH_2COOM$, or

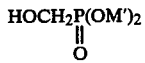

and a di-functional isocyanate compound such as 4,4-diphenylmethane diisocyanate, tolylene diisocyanate or hexamethylene diisocyanate are reacted in DMF or DMSO to give a reaction product between one of the diisocyanate groups and the OH group in the molecule. The OH group in the copolymer and the remaining NCO group are then reacted to produce a binder resin which may be used in accordance with the present invention. The use of a binder resin material including hydrophilic polar groups results in an improved dispersion not only of the magnetic particles but of the spherical small sized particles, thus providing a coating of improved strength.

In addition to the aforementioned binder, magnetic particles, and spherical small sized resin particles, dispersants, lubricants, abrasives, anti-static agents or rust-proofing agents may also be added to the magnetic layer.

The components of the magnetic layer may be dissolved in an organic solvent to provide a magnetic paint which may be applied to the non-magnetic base. The solvents for the magnetic paint may include ketones such as acetone, methylethylketone, methylisobutylketone or cyclohexanone, esters such as methyl acetate, ethyl acetate, butyl acetate, ethyl lactate or glycol monoethylether acetate, glycol ethers such as glycoldimethyl ether or dioxane, aromatic hydrocarbons such as benzene, toluene or xylene, aliphatic hydrocarbons such as hexane or heptane, or chlorinated hydrocarbons such as methylene chloride, ethylene chloride, carbon tetrachloride, chloroform, ethylene chlorohydrin, or dichlorobenzene.

The presence in the magnetic layer of the spherical small sized particles of benzogaunamine-formaldehyde or benzoguanamine-melamine-formaldehyde resin in the manner described results in an improved smoothness of the magnetic layer and improved coating properties.

EXAMPLE 1

The following composition was used as the starting material:

| | |
|---|---|
| Co—coated $\gamma$-$Fe_2O_3$ (specific surface area, 30 $m^2/g$) | 100 weight parts |
| vinyl chloride-vinyl acetate copolymer (supplied by U.C.C. Inc. under trade name of VAGH) | 17.5 weight parts |
| polyurethane resin (supplied by Nippon Polyurethane Co. Ltd. under trade name of N-2304) | 7.5 weight parts |
| spherical small sized particles of benzeguanamine-formaldehyde resin (particle size: 0.3 micron) | 5 weight parts |
| dispersant (lecithin) | 0.5 weight parts |
| lubricant (silicone oil) | 1.0 weight parts |
| abrasive ($Cr_2O_3$) | 2.5 weight parts |
| methylethylketone | 100 weight parts |
| methylisobutylketone | 50 weight parts |
| toluene | 50 weight parts |

The composition was mixed in a sand mill for 24 hours and passed through a 2 micron filter. To the resulting product there was added 2.5 weight parts of a curing agent (Desmodule L, supplied by Bayer AG) and the resulting mixture was mixed for 30 minutes to form a magnetic paint. The paint was applied to a polyester film 14 microns in thickness to a dry thickness of 6 microns, subjected to a magnetic orientation treatment, dried, and taken up on a spool. The resulting roll was calendered and cut into sample tapes each ½ inch wide.

EXAMPLE 2

Sample tapes were prepared using the procedure similar to that of the preceding example, except that small spherical particles having a particle size of 1 to 2 microns of benzoguanamine-formaldehyde resin were used in place of the 0.3 micron particles of the preceding example.

EXAMPLE 3

Sample tapes were prepared using the procedure similar to that of Example 1 except that spherical small sized particles (0.3 micron) of benzoguanamine-melamine-formaldehyde resin were used in place of the corresponding benzoguanamine-formaldehyde resin of Example 1.

EXAMPLE 4

The following composition was used as the starting material:

| | |
|---|---|
| Co—coated $\gamma$-Fe$_2$O$_3$ (specific surface area: 45 m$^2$/g) | 100 weight parts |
| SO$_3$Na group-containing vinyl chloride-vinyl acetate-vinyl alcohol copolymer | 17.5 weight parts |
| SO$_3$Na group-containing polyester polyurethane resin | 7.5 weight parts |
| spherical small sized particles (particle size: 0.3 micron) of the benzoguanamine-formaldehyde resin | 2 weight parts |
| dispersant (lecithin) | 0.5 weight parts |
| lubricant (silicone oil) | 1.0 weight parts |
| abrasive (Cr$_2$O$_3$) | 2.5 weight parts |
| methylethylketone | 100 weight parts |
| methylisobutylketone | 50 weight parts |
| toluene | 50 weight parts |

The composition was mixed in a sand mill for 24 hours and passed through a 2 micron filter. To the resulting product was added 2.5 weight parts of the curing agent (Desmodule L, supplied by Bayer AG) and the resulting mixture was mixed for 30 minutes into a magnetic paint. The paint was applied to a polyester film 14 microns in thickness to a dry thickness of 6 microns, subjected to a magnetic orientation treatment, dried, and taken up on a spool. The resulting roll was calendered and cut into sample tapes each one ½ inch wide.

EXAMPLE 5

Sample tapes were prepared using the procedure of preceding Example 2, except that spherical small sized particles (0.3 micron) of the benzoguanamine-melamine-formaldehyde resin were used in place of the small particles of benzoguanamine-formaldehyde resin of Example 2.

EXAMPLE 6

Sample tapes were prepared by using the procedure of Example 2 except that 5 weight parts of the spherical small sized particles of the benzoguanamine-formaldehyde resin of Example 2 were used.

EXAMPLE 7

Sample tapes were prepared using the procedure of Example 2 except that 7.5 weight parts of the spherical small sized particles of the benzoguanamine-formaldehyde resin of Example 2 were used.

COMPARATIVE EXAMPLE 1

Sample tapes were made up from the following composition:

| | |
|---|---|
| Co—coated $\gamma$-Fe$_2$O$_3$ (specific surface area: 30 m$^2$/g) | 100 weight parts |
| vinyl chloride-vinyl acetate copolymer (supplied by UCC Inc. under trade name of VAGH) | 17.5 weight parts |
| polyurethane resin (supplied by Nippon Polyurethane Co. Ltd. under trade name of N-2304) | 7.5 weight parts |
| dispersant (lecithin) | 0.5 weight parts |
| lubricant (silicone oil) | 1.0 weight parts |
| abrasive (Cr$_2$O$_3$) | 2.5 weight parts |
| methylethylketone | 100 weight parts |
| methylisobutylketone | 50 weight parts |
| toluene | 50 weight parts |

The above composition was mixed for 24 hours in the sand mill, and filtered through a 2 micron filter. To the resulting product was added 2.5 weight parts of the curing agent (Desmodule L, supplied by Bayer AG) and the resulting mixture was further mixed for 30 minutes to produce a magnetic paint. This paint was applied to a polyester film 14 microns in thickness to a dry thickness of 6 microns. The film was subjected to a magnetic orientation treatment, dried, and taken up on a spool. The resulting roll was calendered and cut into sample tapes each ½ inch wide.

COMPARATIVE EXAMPLE 2

Sample tapes were made using the procedure similar to Comparative Example 1 except that Co-coated $\gamma$-Fe$_2$O$_3$ (specific area of 45 m$^2$/g) and a SO$_3$Na-group containing vinyl chloridevinyl acetate-vinyl alcohol copolymer and SO$_3$Na-group containing polyester polyurethane resin were used in place of the Co-coated $\gamma$-Fe$_2$O$_3$ (specific area of 30 m$^2$/g) vinyl chloride-vinyl acetate copolymer and polyurethane resin of Comparative Example 1, respectively.

The still characteristics, frictional coefficients, tape damage, and Y-S/N were then measured from the respective sample tapes prepared in the above Examples and Comparative Examples.

The still characteristics were measured in terms of the time elapsed until the playback output of the sample tape with a recorded 4.2 MHz video signal decreased to 50%. The frictional coefficients were measured between the surface of the magnetic layer and a 1S-stainless steel surface at a tape speed of 0.4 mm/sec and a load of 50 g. Tape damage was evaluated by visually checking the damage of the magnetic layer after a 10-minute long sample tape was reciprocated 100 times.

An excellent tape state was designated by ⊚, an acceptable tape state by ○, a slightly damaged state by △, a notably damaged state by ▲, and a severely damaged state with powder debris on the pinch roller and guide member by X. The value Y-S/N was measured by reproducing the monochromatic image previously recorded on the sample tape for finding the signal to noise ratio.

The results are shown in the following table:

TABLE

| | Still Characteristics (minutes) | Frictional Coefficient | Tape Damage | Y-S/N (dB) |
|---|---|---|---|---|
| Ex. 1 | 350 | 0.30 | △ | −0.2 |
| Ex. 2 | 410 | 0.27 | ○ | −0.5 |
| Ex. 3 | 380 | 0.29 | △~○ | −0.1 |
| Ex. 4 | 530 | 0.34 | △ | +2.5 |
| Ex. 5 | 540 | 0.31 | △ | +2.4 |
| Ex. 6 | 680 | 0.28 | ○ | +2.4 |
| Ex. 7 | 710 | 0.26 | ⊚ | +2.2 |
| Comp. Ex. 1 | 280 | 0.35 | X | 0 |
| Comp. Ex. 2 | 480 | 0.48 | ▲~X | +2.5 |

It will be seen from the above Table that in the Examples wherein spherical small sized particles of the benzoguanamine-formaldehyde resin or benzoguanamine-melamine-formaldehyde resin were contained in the magnetic layer, the frictional coefficient was lowered, while tape durability such as still characteristics or lack of susceptibility to damage were improved. Above all, in Examples 4 to 7 wherein the above particles were used in conjunction with a binder having hydrophilic polar groups, the tape characteristics were notably improved even in cases where the magnetic powders with specific surface areas of 45 m$^2$/g were used.

It should be evident that various modifications can be made to the described embodiments without departing from the scope of the present invention.

We claim as our invention:

1. A magnetic recording medium comprising a non-magnetic base and a magnetic layer containing magnetic powder and a binder attached to said base, said magnetic layer having dispersed therein spherical small sized particles of a benzoguanamine-formaldehyde resin or a benzoguanamine-melamine-formaldehyde resin, the particle size of said resin being in the range from 0.1 to 3 microns.

2. A magnetic recording medium according to claim 1 in which said magnetic powder has a specific surface area of at least 30 m²/g.

3. A magnetic recording medium comprising a non-magnetic base and a magnetic layer containing magnetic powder attached to said base, said magnetic powder having a specific surface area of at least 30 m²/g, said magnetic layer having dispersed therein spherical particles of a benzoguanamine-formaldehyde resin or a benzoguanamine-melamine-formaldehyde resin, said resin having a particle size of from 0.1 to 3 microns, said particles being present in an amount of from 1 to 10 parts by weight for 100 parts by weight of magnetic powder.

4. A magnetic recording medium according to claim 1 wherein said particles are present in an amount of 1 to 10 parts by weight for 100 parts by weight of magnetic powder.

5. A magnetic recording medium according to claim 1 wherein said binder is a synthetic resin having at least one of the following hydrophilic polar groups attached thereto:

—$SO_3M$
—$OSO_3M$
—$COOM$ and

where M is a hydrogen atom or an alkali metal, and M' is a hydrogen atom, an alkali metal or a hydrocarbon group.

6. A magnetic recording medium according to claim 5 in which said synthetic resin is a polyurethane resin, a polyester resin, or a vinyl chloride-vinyl acetate copolymer.